(12) United States Patent
Miksic et al.

(10) Patent No.: US 6,306,210 B1
(45) Date of Patent: Oct. 23, 2001

(54) CORROSION INHIBITOR CONTAINER

(75) Inventors: Boris A. Miksic, North Oaks; Margarita Kharshan, Little Canada, both of MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 09/652,893

(22) Filed: Aug. 31, 2000

Related U.S. Application Data

(63) Continuation-in-part of application No. 09/415,804, filed on Oct. 11, 1999, now abandoned.

(51) Int. Cl.[7] .................................................. C04B 24/04
(52) U.S. Cl. .................... 106/810; 106/634; 106/728; 106/802; 106/823; 206/219; 366/2; 366/3
(58) Field of Search ..................................... 106/634, 728, 106/802, 810, 823; 206/219; 366/2, 3

(56) References Cited

U.S. PATENT DOCUMENTS

| | | | |
|---|---|---|---|
| 4,961,790 | 10/1990 | Smith et al. | 106/823 |
| 5,120,367 | 6/1992 | Smith et al. | 106/823 |
| 5,203,629 | 4/1993 | Valle et al. | 366/2 |
| 5,224,774 | 7/1993 | Valle et al. | 366/2 |
| 5,320,851 | 6/1994 | de Mars et al. | 424/451 |
| 5,326,529 | 7/1994 | Miksic et al. | 422/7 |
| 5,597,514 | 1/1997 | Miksic et al. | 252/390 |
| 5,728,209 | 3/1998 | Bury et al. | 106/819 |
| 5,989,334 | 11/1999 | Dry | 106/677 |

*Primary Examiner*—Anthony Green
(74) *Attorney, Agent, or Firm*—Haugen Law Firm PLLP

(57) ABSTRACT

The method of adding migrating corrosion inhibitors to a raw concrete mix by loading a migrating corrosion inhibitor in powder form within a container fabricated from a water soluble film, and thereafter depositing the container into a hydrated concrete mix for blending. The container is preferably fabricated from a film consisting of polyvinyl alcohol.

3 Claims, No Drawings

CORROSION INHIBITOR CONTAINER

CROSS-REFERENCE TO RELATED APPLICATIONS

The present application is a continuation-in-part of application Ser. No. 09/415,804, filed Oct. 11, 1999, entitled "CORROSION INHIBITOR CONTAINER", now abandoned and assigned to the same assignee as the present invention.

BACKGROUND OF THE INVENTION

The present invention relates generally to an improved technique for conveniently adding highly effective migrating corrosion inhibitors to raw concrete, and including a technique for controllably and reliably adding such inhibitors to raw concrete mixes. The present invention utilizes a water soluble envelope or bag into which highly effective corrosion inhibitors are packaged, with the entire bag along with its contents being conveniently added to concrete mixes, including those mixes in the process of being blended in either stationary or portable mixers. Selected migrating corrosion inhibitors (MCI) comprising an alkali metal gluconate such as sodium gluconate and ammonium benzoate, and other dry inhibitors are blended and conveniently packaged in a water soluble bag, pouch or envelope in order to provide a measured and convenient method of adding such inhibitors to form complete concrete admixtures. These corrosion inhibitors, when added to the raw concrete mix, have been found to provide effective long-term protection for reinforcements including rebar as conventionally employed in concrete structures.

The formulations of the present invention are employed without reduction of the inherent strength of the concrete. Indeed, the strength, durability and appearance of the finished concrete are virtually unaltered, and when employed with a plasticizer, the mix remains fresh and plastic to permit more appropriate working.

In the past, certain types of migrating corrosion inhibitors have been blended with raw concrete in order to provide effective long-term rebar protection. While this form of addition has been effective, the entire process is improved, simplified and expedited when the MCI materials of the present invention are pre-packaged in containers so that the entire package may be added to and blended with the concrete mix. The present invention employs highly effective MCI materials which are packaged in water soluble bags or pouches, and thereby added at a known rate or in a predetermined quantity to concrete mix. As such, the MCI materials of the present invention are as well conveniently controlled, and rendered available for ultimate end use.

The bag containing the MCI chemicals is added to the raw concrete so that the ingredients become thoroughly mixed. Mixing is typically undertaken either on the site or in a central batching and mixing location with the fresh concrete being taken and delivered to the site and revolving drum ready-mix trucks.

In addition to those mixtures set forth herein, suitable MCI mixtures which are also well adapted to concrete are disclosed in U.S. Pat. No. 5,597,514 entitled "CORROSION INHIBITORS FOR REDUCING CORROSION IN METALLIC CONCRETE REINFORCEMENT", and assigned to the same assignee as the present invention. In addition to being highly effective as migrating inhibitors for the present application in concrete, these inhibitors have also been found to be soundly adapted for packaging in water soluble bags.

SUMMARY OF THE INVENTION

In accordance with the present invention, pre-measured quantities of a selected MCI chemical compound is packaged in a water soluble bag or pouch, and thus rendered appropriate for use in raw concrete mixes. The contents of bags may be controllably adjusted and/or variable, thereby enabling the process to be utilized with small on-site mixers, as well as in the well known revolving drum truck-mounted systems. In either event, the appropriate amount of MCI chemical can be conveniently added to the mix and blended, with the water soluble bags dissolving and ultimately becoming fully dispersed throughout the mix. Because of the low quantity of bag or pouch material being employed, the physical and mechanical properties of the concrete are only moderately affected.

While the formulations of the selected MCI materials may be retained appropriately in water soluble bags, in certain environments and geographical regions, it may be appropriate to package the water soluble bags within a polyethylene bag prior to use in order to protect the contents against exposure to humidity and water. Water soluble bags are available commercially, with one such type being available from Aquafilm Co. of Winston Salem, N.C. under the trade designation "L Series".

Therefore, it is a primary object of the present invention to provide an improved form of packaging for MCI chemicals which are selected for use as additives as corrosion inhibitors used in admixture with raw concrete.

It is a further object of the present invention to employ migrating corrosion inhibitors such as sodium gluconate and ammonium benzoate which may be packaged in powder form in a water soluble bag or pouch to provide a pre-measured and convenient method of adding these inhibitors to concrete admixtures for effective long-term rebar protection.

Other and further objects of the present invention will become apparent to those skilled in the art upon a study of the following specification and appended claims.

DESCRIPTION OF THE PREFERRED EMBODIMENT

The preferred embodiment of the present invention is set forth in the following examples:

EXAMPLE I

A powder mix consisting of sodium gluconate, sodium metasilicate and ammonium benzoate was prepared in the following ratios:

| Component | Parts by Weight |
| --- | --- |
| Sodium metasilicate | 50 parts |
| Ammonium benzoate | 25 parts |
| Sodium gluconate | 25 parts. |

After blending the mix, it was packaged in a water soluble bag of the type available from Aquafilm of Winston Salem, N.C. under the trade designation "L" Series. These bags are prepared from polyvinylalcohol film and soluble in cold water, and compatible with the migrating corrosion inhibitor formulation above. This mix is added to a concrete admixture at a rate of one pound per cubic yard of concrete.

EXAMPLE II

A modified formulation of powder mix was prepared mixing powders in the following ratios:

| Component | Parts by Weight |
| --- | --- |
| Amorphous silicon dioxide | 50 parts |
| Zinc gluconate | 25 parts |
| Ammonium benzoate | 25 parts. |

The mix was packaged in a water soluble bag commercially available from Aquafilm of Winston Salem, N.C. under the trade designation "L Series", with this bag being fabricated of a film consisting essentially of polyvinylalcohol. Alkali metal gluconates are particularly effective in the present application, with the highly effective alkali metal gluconates being sodium potassium and ammonium. As indicated in Example II hereinabove, zinc gluconate is also particularly useful.

In a controlled experiment it was found that the MCI chemicals alone had an effect on the property of the cement in that the compression strength of the MCI sample was 17% higher than the control at seven days and 11% at 28 days. When the MCI chemicals were mixed in to the concrete with a water soluble bag, the air content was increased moderately, the slump was increased slightly and the compression strength at seven and 28 days was equal to the control.

The corrosion resistance of the components of Example I and II were evaluated using an immersion test at room temperature. Pre-weighed steel panels were washed with methanol, air-dried, and immersed in a solution of saturated $Ca(OH)_2$ containing 3.5% NaCl for 40 days. Examples I and II provided very good protection to the panels at a concentration levels of 0.4%, 0.5%, and 0.8% with Example I providing 95.5% protection and Example II providing 100% protection against corrosion.

The above examples are given for purposes of illustration only and are not to be otherwise construed as a limitation upon the scope of the following appended claims.

What is claimed is:

1. The method of blending migrating corrosion inhibitors with raw hydrated concrete mix prior to being introduced into a form defining a structural member for protecting metallic concrete reinforcements being retained within said structural member against corrosion by incorporation of a source of migrating corrosion inhibitors within the said raw hydrated concrete mix through the following steps:

(a) packaging a quantity of a migrating corrosion inhibitor in powder form within a container fabricated from a water soluble film, the migrating corrosion inhibitor comprising a mixture of an alkali metal benzoate and a gluconate which is selected from the group consisting of alkali metal and zinc gluconates;

(b) depositing said container into a raw concrete mix;

(c) blending the contents of said container with said raw concrete mix at a concentration level of about one pound migrating corrosion inhibitor per cubic yard of concrete;

(d) depositing the concrete mix and corrosion inhibitor blend into the structural member; and (e) working the concrete mix and permitting the mix to become set.

2. The method as defined in claim 1 wherein said migrating corrosion inhibitor consists of a 50:50 blend of ammonium benzoate and sodium gluconate, to which an equivalent amount of sodium metasilicate is added.

3. The method as defined in claim 1 wherein said migrating corrosion inhibitor consists of a 50:50 blend of ammonium benzoate and zinc gluconate, to which an equivalent amount of amorphous silicon dioxide is added.

* * * * *